US012565963B2

(12) United States Patent
Liu et al.

(10) Patent No.: US 12,565,963 B2
(45) Date of Patent: Mar. 3, 2026

(54) MOUNTING BRACKET FOR CUSTOMER PREMISE EQUIPMENT AND CUSTOMER PREMISE EQUIPMENT

(71) Applicant: ZTE CORPORATION, Shenzhen (CN)

(72) Inventors: Fan Liu, Shenzhen (CN); Danni Wang, Shenzhen (CN); Cheng Zhao, Shenzhen (CN); Qingyi Tong, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 237 days.

(21) Appl. No.: 18/275,635

(22) PCT Filed: Feb. 24, 2022

(86) PCT No.: PCT/CN2022/077549
§ 371 (c)(1),
(2) Date: Aug. 3, 2023

(87) PCT Pub. No.: WO2022/218037
PCT Pub. Date: Oct. 20, 2022

(65) Prior Publication Data
US 2024/0019078 A1 Jan. 18, 2024

(30) Foreign Application Priority Data
Apr. 14, 2021 (CN) .......................... 202120756968.2

(51) Int. Cl.
*F16M 13/02* (2006.01)
*H04Q 1/04* (2006.01)
(52) U.S. Cl.
CPC .............. *F16M 13/02* (2013.01); *H04Q 1/04* (2013.01); *F16M 2200/08* (2013.01)

(58) Field of Classification Search
CPC .. F16M 11/041; F16M 13/02; F16M 2200/08; H04Q 1/04
(Continued)

(56) References Cited

U.S. PATENT DOCUMENTS 4,527,760 A 7/1985 Salacuse
4,653,708 A * 3/1987 Rich ........................ G01K 1/14
337/380
(Continued)

FOREIGN PATENT DOCUMENTS

CN 203864591 U 10/2014
CN 205877769 U 1/2017
(Continued)

OTHER PUBLICATIONS

International Search Report of PCT Patent Application No. PCT/CN2022/077549 issued on May 30, 2022.
(Continued)

*Primary Examiner* — Bradley Duckworth
(74) *Attorney, Agent, or Firm* — HAUPTMAN HAM, LLP

(57) ABSTRACT

Disclosed are a mounting bracket for a customer premise equipment and a customer premise equipment. The mounting bracket includes a bracket base (1) and a fixing frame (2). The bracket base (1) is fixedly connected to the fixing frame (2). An accommodation cavity is formed in the base (1). A bottom of the accommodation cavity is in contact with a bottom of the mounting end. A plurality of first fasteners (11) extending towards a center of the accommodation cavity are provided on a side wall of the accommodation cavity. At least two of the plurality of first fasteners (11) are provided opposite to each other. A gap is reserved between the first fasteners (11) and the bottom of the accommodation
(Continued)

cavity. A height of the gap is adapted to a thickness of a second fastener on the mounting end.

7 Claims, 7 Drawing Sheets

(58) Field of Classification Search
USPC ..................................................... 248/222.52
See application file for complete search history.

(56) References Cited

U.S. PATENT DOCUMENTS

| | | | | |
|---|---|---|---|---|
| 8,830,663 | B2 * | 9/2014 | Child ................ | H04M 1/72409 |
| | | | | 361/679.01 |
| 8,979,048 | B2 * | 3/2015 | Tschann .................. | F16M 11/08 |
| | | | | 403/345 |
| 9,185,953 | B2 * | 11/2015 | Whitten ................. | B62J 50/225 |
| 9,532,474 | B2 * | 12/2016 | Gutschenritter ....... | F16M 13/04 |
| 10,176,651 | B2 * | 1/2019 | Grziwok ................ | F16M 13/00 |
| 10,550,992 | B2 * | 2/2020 | Yun ..................... | B60R 11/0241 |
| 11,510,497 | B2 * | 11/2022 | Clapp .................. | F16M 13/022 |
| 11,525,470 | B2 * | 12/2022 | Richter ................. | F16M 13/02 |
| 11,608,929 | B2 * | 3/2023 | Painter ...................... | F16B 1/00 |
| 2020/0022276 | A1 | 1/2020 | Barany et al. | |
| 2020/0132244 | A1 | 4/2020 | Yun et al. | |
| 2021/0121719 | A1 * | 4/2021 | Ivory ........................ | A45F 5/02 |

FOREIGN PATENT DOCUMENTS

| | | | |
|---|---|---|---|
| CN | 106686925 | A | 5/2017 |
| CN | 207328311 | U | 5/2018 |
| CN | 207648379 | U | 7/2018 |
| CN | 208386679 | U | 1/2019 |
| CN | 209325373 | U | 8/2019 |
| CN | 111009197 | A | 4/2020 |
| CN | 210491367 | U | 5/2020 |
| CN | 211475254 | U | 9/2020 |
| CN | 215635822 | U | 1/2022 |
| EP | 2808593 | B1 | 12/2014 |
| WO | 2012064694 | A1 | 5/2012 |

OTHER PUBLICATIONS

Search Report in Corresponding European Application No. 22787267.8, dated Jan. 24, 2025; 9 pgs.

* cited by examiner

MOUNTING BRACKET FOR CUSTOMER PREMISE EQUIPMENT AND CUSTOMER PREMISE EQUIPMENT

CROSS-REFERENCE OF RELATED APPLICATIONS

The present disclosure claims the priority of Chinese Patent Application No. CN202120756968.2 entitled "mounting bracket for customer premise equipment and customer premise equipment" and filed on Apr. 14, 2021, the content of which is incorporated herein by reference in its entirety.

TECHNICAL FIELD

An embodiment of the present disclosure relates to, but is not limited to, a field of tool and instrument, especially relates to, but is not limited to, a mounting bracket for a customer premise equipment and a customer premise equipment.

BACKGROUND

An existing CPE (customer premise equipment) on the market is fixed inside a bracket mostly by a fastener, which is difficult for mounting the CPE and even more difficult for removing it after being mounted. Moreover, such a design adopting the fastener is prone to scratching a surface of the CPE, and a service life of the fastener is limited.

SUMMARY

An embodiment of the present disclosure provides a mounting bracket for a customer premise equipment and a customer premise equipment.

An embodiment of the present disclosure provides a mounting bracket for a customer premise equipment. The mounting bracket includes a bracket base and a fixing frame, the bracket base is fixedly connected to the fixing frame, an accommodation cavity for allowing a mounting end of the customer premise equipment CPE to be inserted is formed in the base, and a bottom of the accommodation cavity is in contact with a bottom of the mounting end to form a support for the mounting end; a plurality of first fasteners extending towards a center of the accommodation cavity are provided on a side wall of the accommodation cavity, and at least two of the plurality of first fasteners are provided opposite to each other; a gap is reserved between the first fasteners and the bottom of the accommodation cavity, and a height of the gap is adapted to a thickness of a second fastener on the mounting end; and after the mounting end of the CPE is inserted into the accommodation cavity, the CPE is rotated to engage the first fasteners with the second fastener, to complete mounting of the CPE.

An embodiment of the present disclosure further provides a customer premise equipment. The customer premise equipment includes a housing and an equipment body placed inside the housing. The housing includes a mounting end which is insertable into an accommodation cavity of a mounting bracket, a second fastener is provided on the mounting end, and a thickness of the second fastener is adapted to a bottom of the accommodation cavity and a first fastener on a side wall of the accommodation cavity; and after the mounting end of the customer premise equipment CPE is inserted into the accommodation cavity, the CPE is rotated to engage the first fastener with the second fastener, to complete mounting of the CPE.

Other features and corresponding beneficial effects of the present disclosure will be set forth and illustrated in a later part of the description, and it should be understood that, at least partial beneficial effects will become apparent from the recitation of the description of the present disclosure.

DETAILED DESCRIPTION OF THE EMBODIMENTS

In order to make the objectives, technical solutions, and advantages of the present disclosure more clear, the embodiments of the present disclosure will be further illustrated in detail below by specific implementations in combination with accompanying drawings. It should be understood that, the specific embodiments described herein are only used to explain the present disclosure, but are not intended to limit the present disclosure.

Embodiment One

Figure 1:
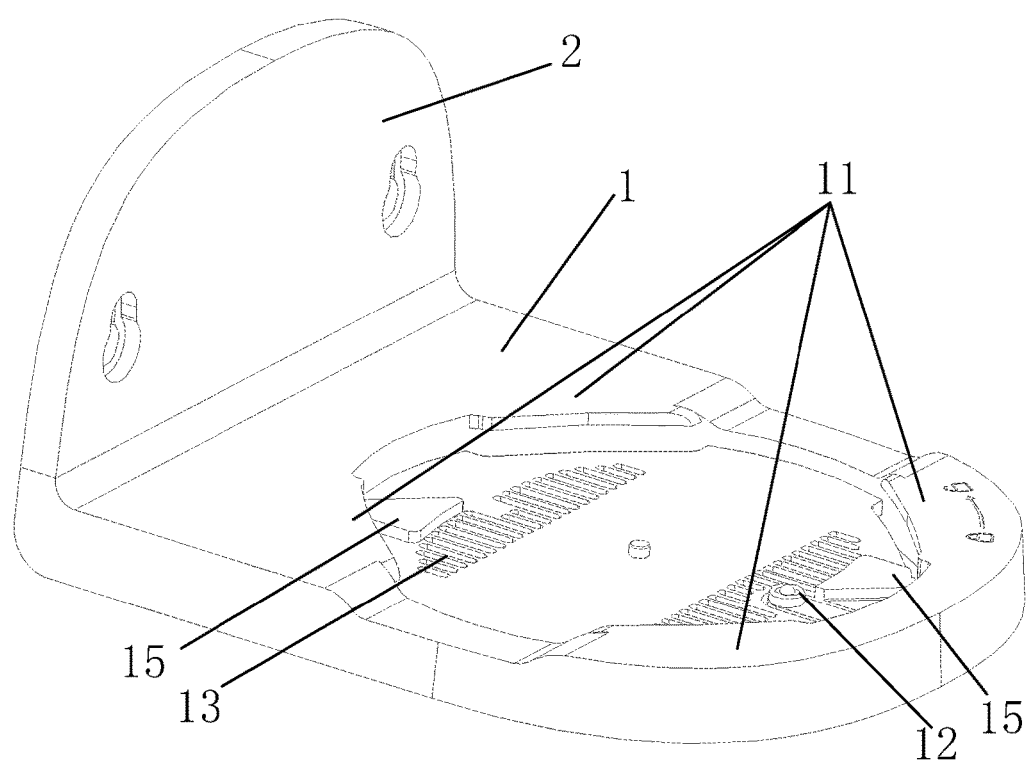
FIG. 1 is a schematic diagram of a basic structure of a mounting bracket according to Embodiment one of the present disclosure.

An embodiment of the present disclosure provides a mounting bracket for a customer premise equipment. As shown in FIG. 1, the mounting bracket includes a bracket base 1 and a fixing frame 2.

The bracket base 1 is fixedly connected to the fixing frame 2. An accommodation cavity for allowing insertion of a mounting end of a customer premise equipment CPE 3 is formed in the base 1, and a bottom of the accommodation cavity is in contact with a bottom of the mounting end to support the mounting end.

In this embodiment, the bracket base 1 and the fixing frame 2 may be integrated into one piece, and a certain angle is formed between the fixing frame 2 and the bracket base 1. For example, when the mounting bracket needs to be mounted on a wall, the fixing frame 2 may be perpendicular to the bracket base 1. Mounting holes may be provided in the fixing frame 2, and are used for mounting the mounting bracket to a surface of the wall. Of course, a specific angle may be set according to actual requirements.

A plurality of first fasteners 11 extending towards a center of the accommodation cavity are provided on a side wall of the accommodation cavity, and at least two of the plurality of first fasteners 11 are provided opposite to each other. A gap is reserved between a first fastener 11 and the bottom of the accommodation cavity, and a height of the gap is adapted to a thickness of a second fastener on the mounting end.

In this embodiment, the plurality of first fasteners 11 extending towards the center of the accommodation cavity are provided on the side wall of the accommodation cavity, for example, there may be two or more first fasteners 11. The plurality of first fasteners 11 extending towards the center of the accommodation cavity are provided at intervals on the side wall of the accommodation cavity, and at least two of the plurality of first fasteners 11 are provided opposite to each other. The gap is reserved between the first fastener 11 and the bottom of the accommodation cavity, and the height of the gap is adapted to the thickness of the second fastener on the mounting end of the CPE3. Therefore, the second fastener on the mounting end of the CPE3 may be screwed into the at least two first fasteners 11 to complete engagement.

After the mounting end of the CPE3 is inserted into the accommodation cavity, the CPE3 is rotated to engage the first fasteners with the second fastener, to complete mounting of the CPE3.

In this embodiment, the accommodation cavity is provided in the mounting bracket, and at least one pair of first fasteners are provided opposite to each other on the accommodation cavity, such that the CPE3 may be mounted to the mounting bracket by screwing the second fastener of the CPE3 into the first fasteners; and when the CPE3 is required to disassemble from the mounting bracket, the CPE3 may be unscrewed. Therefore, the mounting bracket of the present disclosure is easy to operate and will not cause scratching of the appearance of the CPE3.

In an example, as shown in FIG. 1, the mounting bracket further includes at least one first stopper 15 protruding towards an axial line of the accommodation cavity, and the first stopper is provided to cooperate with a foot pad on the second fastener to limit a rotation angle of the CPE3.

In an example, the mounting bracket further includes at least one first stopper 15 provided in the accommodation cavity, for example, especially provided on the side wall of the accommodation cavity, or at the bottom of the accommodation cavity, or between the bottom of the accommodation cavity and the side wall. In this example, as shown in FIG. 1, first stoppers 15 are provided at the bottom of the accommodation cavity, and each of the first stoppers 15 has a structure of triangular protrusion. In this example, the second fastener on the mounting end of the CPE3 may be further provided thereon with a protruding foot pad 32, and the protruding foot pad 32 may be made of rubber material, for on one hand preventing the mounting end and a bottom surface from being scratched during rotation and at the same time lifting a certain space to improve heat dissipation. After the CPE3 is rotated to a predetermined position, the foot pad 32 may cooperate with the first stopper 15 to position the CPE3.

Figure 2:
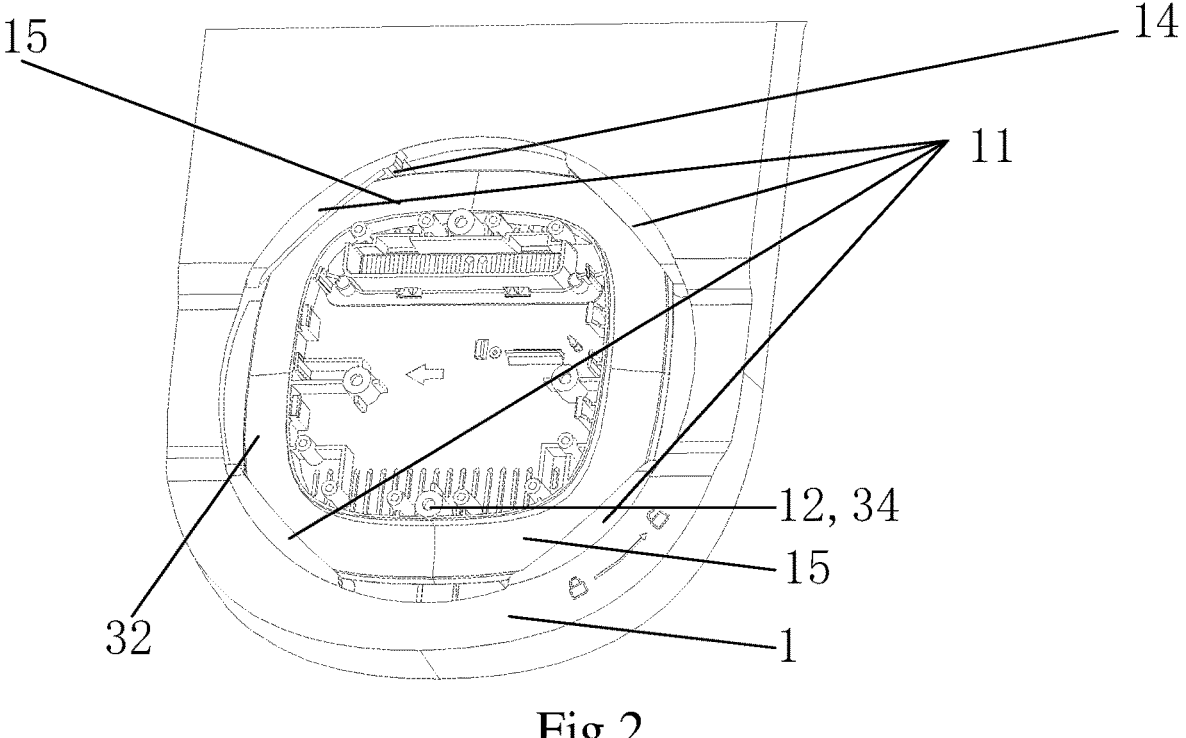
FIG. 2 is a diagram of a case in which a CPE is located in an accommodation cavity after rotation according to Embodiment one of the present disclosure.

In an example, as shown in FIG. 2, the mounting bracket further includes at least one second stopper 14 on the side wall of the accommodation cavity, and the second stopper 14 is provided to cooperate with an outer edge of the second fastener to limit the rotation angle of the CPE3.

Unlike the previous example, in this example, the mounting bracket further includes at least one second stopper 14 provided to cooperate with the outer edge of the second fastener to limit the rotation angle of the CPE3. In this example, the second stopper 14 may be positioned on the side wall of the accommodation cavity or directly on an outer edge of the first fastener 11. Therefore, after the CPE3 is rotated to a predetermined position, the second stopper 14 may hinder further rotation of the CPE3, thereby positioning the CPE3.

In an example, as shown in FIG. 2, unlike the previous example, the first stopper 15 and the second stopper 14 may be simultaneously provided in this example. Of course, the specific numbers thereof may be set according to actual requirements. For example, there may be one first stopper and one second stopper, or there may be two first stoppers 15 and one second stopper 14. Therefore, the positioning of the CPE3 is achieved by the cooperation of the first stopper 15 and the second stopper 14.

In an example, the mounting bracket includes two first stoppers 15 provided symmetrically. The two first stoppers 15 are provided to cooperate with the foot pad to limit the rotation direction of the CPE3. In this example, there are two first stoppers 15 in the accommodation cavity, and the two first stoppers 15 are symmetrically provided, such that the rotation direction of the CPE3 may be limited after it is inserted into the accommodation cavity. As shown in FIG. 1, the CPE3 may only be rotated clockwise, while a path for counterclockwise rotation will get stuck.

Alternatively, in an example, the mounting bracket includes two second stoppers 14 provided symmetrically. The two second stoppers 14 are provided to cooperate with the outer edge of the second fastener to limit the rotation direction of the CPE3. In this example, based on a similar structural concept, the rotation direction of the CPE3 may be limited by providing two symmetrical second stoppers 14.

Alternatively, in an example, the mounting bracket includes the first stopper 15 and the second stopper 14, and the first stopper 15 is provided with the second stopper 14 in pair and at corresponding positions. As shown in FIG. 2, in a case where both the first stopper 15 and the second stopper 14 are provided, in this example, the first stopper 15 and the second stopper 14 are provided in pair and at the corresponding positions, thereby ensuring that the achieved limited position and limited rotation are concurrent.

Figure 3:
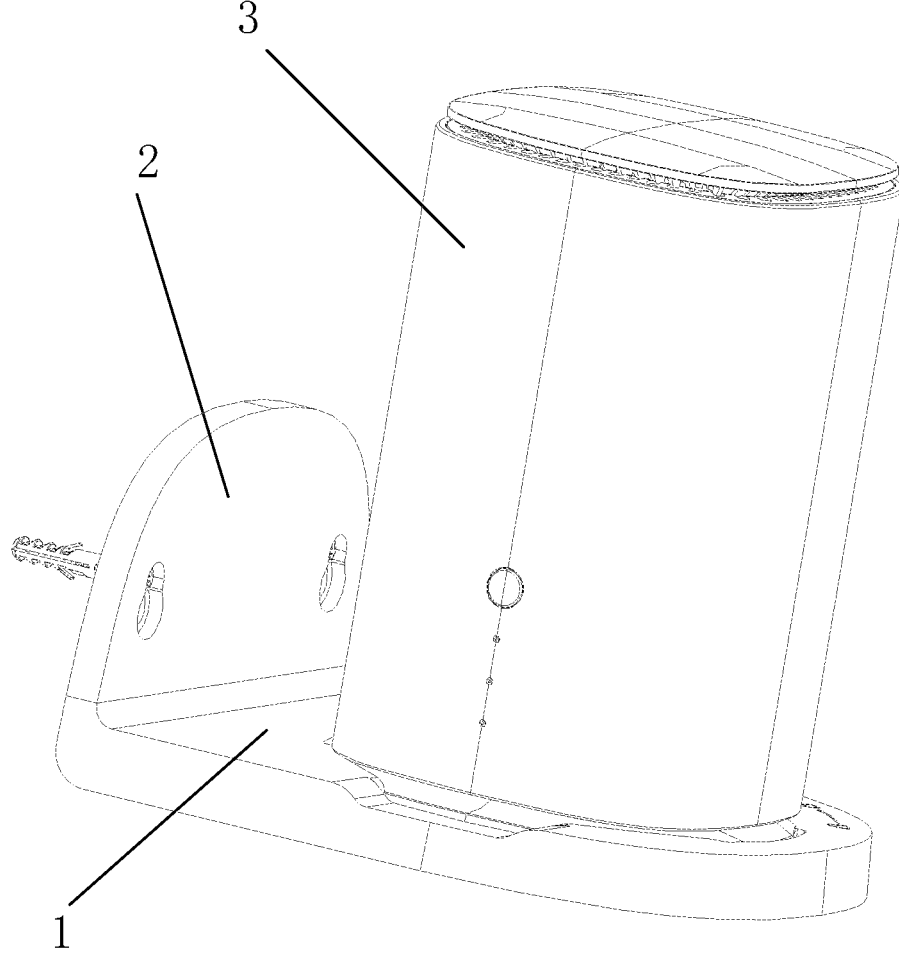
FIG. 3 is a schematic diagram for mounting a CPE according to Embodiment one of the present disclosure.

Good fool-proofing may be achieved by providing two first stoppers 15 and/or second stoppers 14. Moreover, since an equipment bracket in existing technical solutions cannot satisfy scenarios where a user has requirements on the mounting direction of the CPE, by cooperation of two first stoppers 15 and/or second stoppers 14 with the mounting end of the CPE, the mounting direction of the CPE may be fixed to one or two directions, thereby satisfying scenarios where a user has requirements on the mounting direction of the CPE. For example, in FIG. 3, the CPE is mounted outward.

In an example, the mounting bracket further includes at least one positioning member 12 in the accommodation cavity, and the positioning member 12 is provided to lock the CPE3 after the CPE3 is rotated to a predetermined position.

In an example, the positioning member 12 may be provided at the bottom or on the side wall of the accommodation cavity. In this example, a case in which the positioning member 12 is provided at the bottom of the accommodation cavity is taken as an example for illustration. The mounting end of the CPE3 is provided with a matching member corresponding to the positioning member 12. In this example, a case in which the positioning member 12 is a positioning protrusion and the matching member 34 is a matching groove is taken as an example for illustration. A plurality of matching grooves may be provided symmetrically to facilitate the mounting of the CPE3 in different directions. After the CPE3 is rotated to a predetermined position, the positioning protrusion springs up to be engaged into the matching groove, thereby locking the CPE. Of course, other cooperation methods of the positioning member 12 and the matching member 34 may be adopted, for example, the cooperation thereof may be completed by using a similar structure on the side wall.

In an example, the number of first fasteners 11 is 2 or the number of first fasteners 11 is 4. The first fasteners 11 are provided symmetrically on the side wall of the accommodation cavity.

In an example, the number of first fasteners 11 is 2, and the two first fasteners 11 are provided at an angle of 180°. Alternatively, the number of first fasteners is 4, and the four first fasteners 11 are provided at an angle of 90°. As shown in FIG. 1, the four first fasteners 11 are provided on the side wall of the accommodation cavity and are flushed with an upper surface of the bracket base 1.

In an example, the bracket base is further provided thereon with an insertion direction guidance identifier for the CPE3.

In this example, the insertion direction guidance identifier may include a rotation identifier engraved on the base 1 and identification slots at two opposite positions of the base 1.

In an example, a heat dissipation slot 13 is further provided at the bottom of the accommodation cavity.

In this example, the positions of heat dissipation slots 13 may correspond to heat dissipation holes of the CPE after mounting, so as to improve heat dissipation effect.

To sum up, the mounting bracket provided in this embodiment is mounted with the CPE by adopting a rotary cooperation between the first fasteners provided at intervals along the circumferential direction of the accommodation cavity and the second fastener at the mounting end of the CPE, which is simple, labor-saving and easy to remove, thereby effectively avoiding scratching of the body, avoiding damage to the fasteners of the bracket, and extending the service life of the bracket. At the same time, the mounting bracket further has both orientation function and pool-proofing function, so as to satisfy scenarios where a user has requirements on the mounting direction.

Embodiment Two

Figure 4:
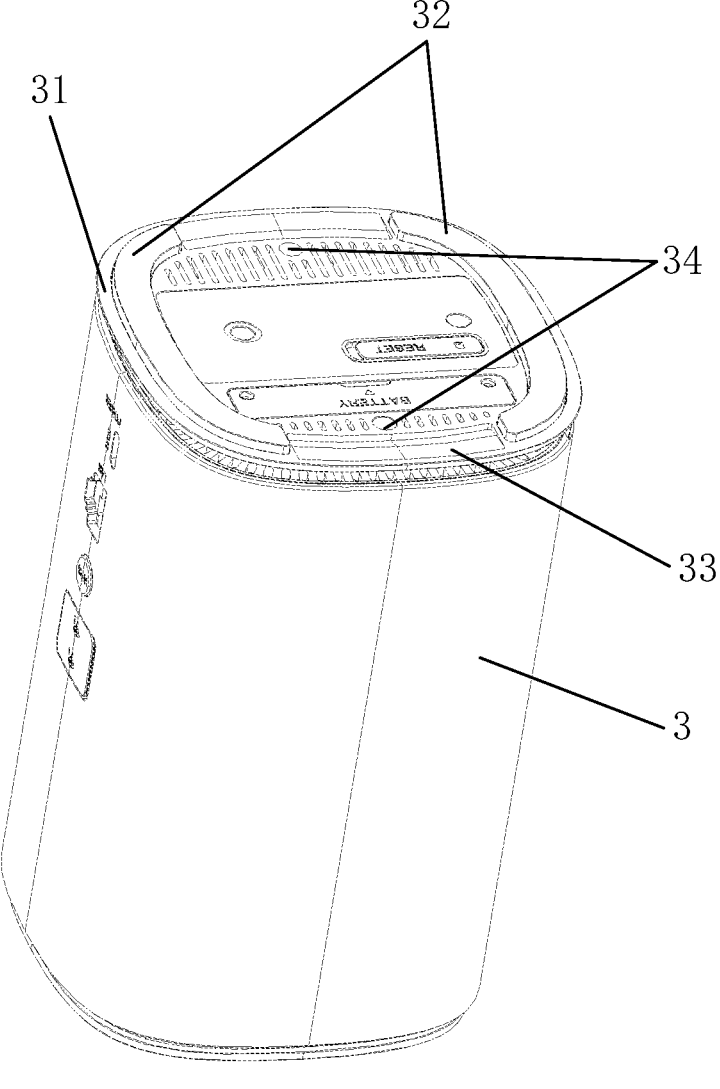
FIG. 4 is a schematic diagram of a basic structure of a CPE according to Embodiment two of the present disclosure.

This embodiment provides a customer premise equipment 3. As shown in FIG. 4, the customer premise equipment includes a housing and an equipment body placed inside the housing.

The housing includes one mounting end which is insertable into an accommodation cavity of a mounting bracket. A second fastener 31 is provided on the mounting end, and a thickness of the second fastener 31 is adapted to a gap between a bottom of the accommodation cavity and a first fastener 11 on a side wall of the accommodation cavity.

After the mounting end of the customer premise equipment CPE is inserted into the accommodation cavity, the CPE is rotated to engage the second fastener 31 with the first fastener 11, to complete the mounting of the CPE.

Figure 5:
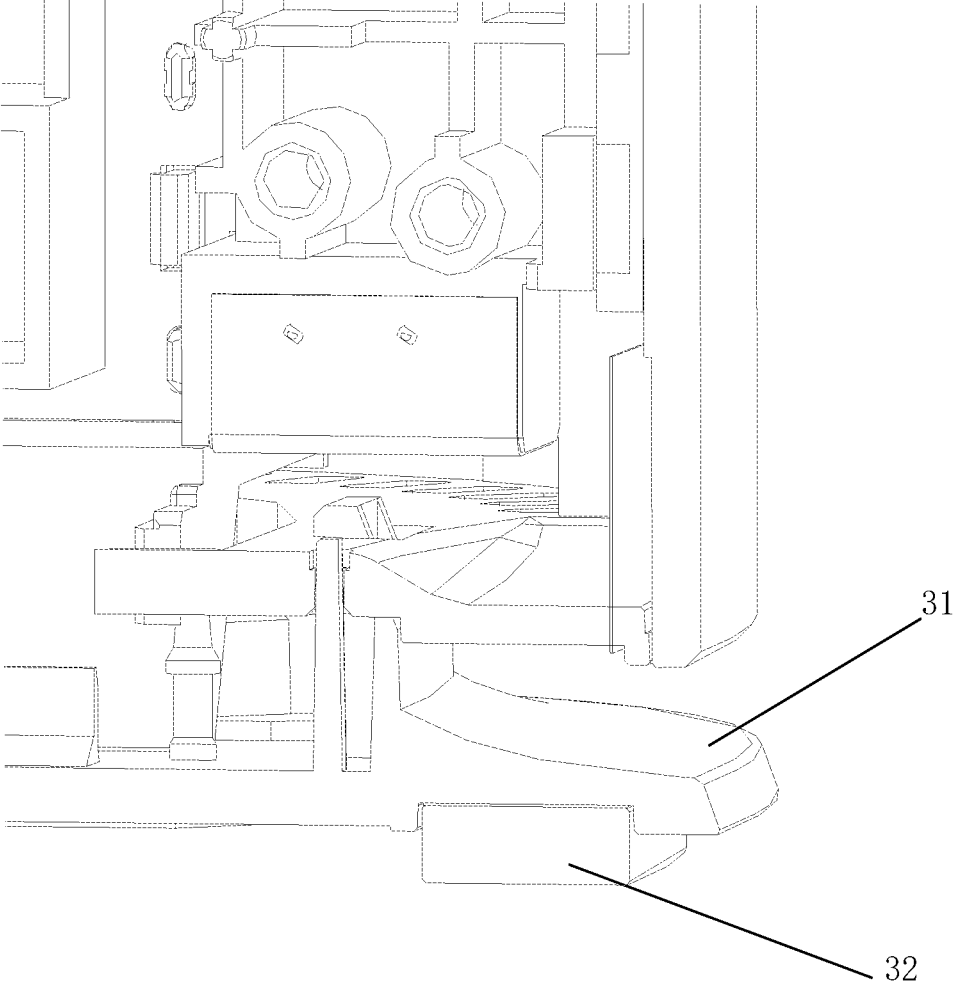
FIG. 5 is a schematic diagram of a local structure of a CPE according to Embodiment two of the present disclosure.

As shown in FIG. 5, in this example, the CPE 3 includes one mounting end which is insertable into the accommodation cavity, and the CPE is supported by the mounting end.

The second fastener 31 is provided on the mounting end, and the thickness of the second fastener 31 is adapted to the gap between the bottom of the accommodation cavity and the first fastener 11 on the side wall of the accommodation cavity. That is, the second fastener 31 may be screwed into the first fastener 11 to achieve engagement, so as to complete mounting and fixation of the CPE.

In this embodiment, the CPE is provided with the one mounting end which may be inserted into the accommodation cavity of the mounting bracket, such that the mounting of the CPE may be completed by screwing the second fastener of the CPE3 into the first fastener on the side wall of the accommodation cavity, and when the CPE is required to be disassembled, the CPE3 may be unscrewed. Therefore, the mounting bracket of the present disclosure is easy to operate and will not cause scratching of the appearance of the CPE3.

In an example, the second fastener is further provided thereon with a foot pad 32 to cooperate with the first stopper 15 of the mounting bracket to limit a rotation angle of the CPE3.

In an example, the second fastener is further provided thereon with a protruding foot pad 32, and the foot pad 32 may be made of rubber material, thereby reducing scratching between the mounting end and a bottom surface of the accommodation cavity. In this example, a sum of a thickness of the protruding foot pad 32 and a thickness of the second fastener 31 itself is adapted to the gap between the bottom of the accommodation cavity and the first fastener 11 on the side wall of the accommodation cavity, thereby achieving fixation after screwing.

Alternatively, in an example, the second fastener 31 further includes a stopping portion to cooperate with the second stopper 14 of the mounting bracket, so as to limit the rotation angle of the CPE.

In some examples, for example, in a case where the accommodation cavity is a circular accommodation cavity and the mounting end of the CPE has an approximately square structure, the stopping portion of the second fastener may be an outer edge at four corners of the CPE. That is, by utilizing a principle that a length of the diagonal line of the mounting end is greater than a distance from the second stopper 14 to an opposite side wall, the rotation angle of the CPE may be controlled, similar to a cooperation method between the first stopper 15 and the foot pad 32.

Alternatively, in an example, the second fastener 31 is provided thereon with both the stopping portion and the foot pad 32.

In an example, the number of the second fasteners 31 corresponds to the number of the first fasteners 11, or the second fastener 31 has an integrated structure.

In an example, at least two second fasteners 31 may be provided at the mounting end of the CPE. The at least two second fasteners 31 are provided opposite to each other, and after mounting, may cooperate with the first fasteners 11 to complete the fixing of the CPE.

Alternatively, the second fastener 31 may be an integrated structure. In order to enhance stopping effect of the first stopper 15, a plurality of foot pads 32 may be provided on the second fastener 31 at intervals, and a groove structure 33 may be provided between any two foot pads 32, so as to enhance stopping effect of the first stopper 15.

In an example, as shown in FIG. 4, the mounting end of CPE3 is provided thereon with a matching member corresponding to the positioning member 12. In this example, a case in which the positioning member 12 is a positioning protrusion and the matching member 34 is a matching groove is taken as an example for illustration. A plurality of matching grooves may be provided symmetrically to facilitate the mounting of the CPE3 in different directions. After the CPE 3 is rotated to a predetermined position, the positioning protrusion springs up to be engaged into the matching groove, thereby achieving locking of the CPE. Of course, other cooperation methods of the positioning member 12 and the matching member 34 may be adopted, for example, the cooperation thereof may be completed by using a similar structure on the side wall.

In this embodiment, the CPE is mounted with the CPE by rotary cooperation of the second fastener at the mounting end and the first fastener of the mounting bracket, which is simple, labor-saving and easy to remove, thereby effectively avoiding scratching of the body, avoiding damage to the fasteners of the bracket, and extending the service life of the bracket. Moreover, the mounting of the CPE has both orientation function and pool-proofing function, so as to satisfy scenarios where a user has requirements on the mounting direction Embodiment Three An embodiment provides a mounting process for a mounting bracket and a CPE. In this embodiment, the mounting bracket includes a base 1 in which a circular accommodation cavity is provided, and four first fasteners 11 are provided on a side wall of the accommodation cavity. The CPE includes a mounting end on which a second fastener 31 is provided. In this example, the mounting end of the CPE is of a square structure, and the first fastener is integrally shaped. The second fastener 31 is provided thereon with two foot pads 32 arranged in a Z-shaped pattern. A length of a diagonal line of the mounting end of the CPE matches with a diameter of the circular accommodation cavity.

Figure 6:
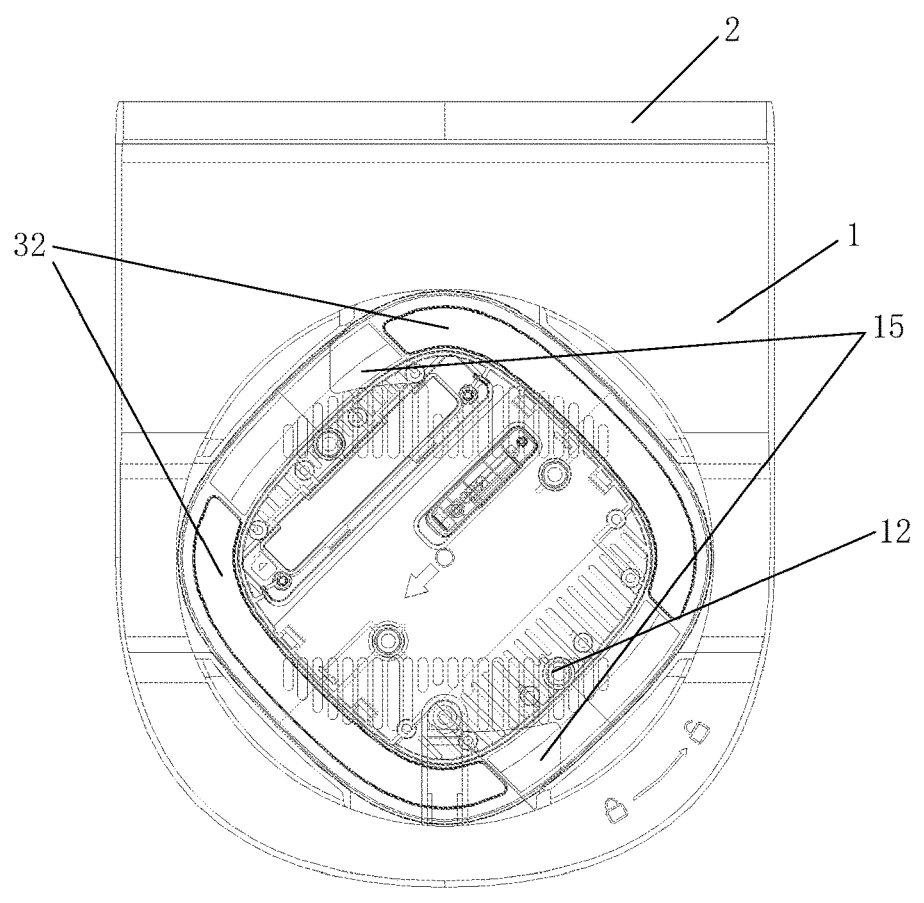
FIG. 6 is a diagram of a case in which a CPE is inserted into an accommodation cavity according to Embodiment three of the present disclosure.
Figure 7:
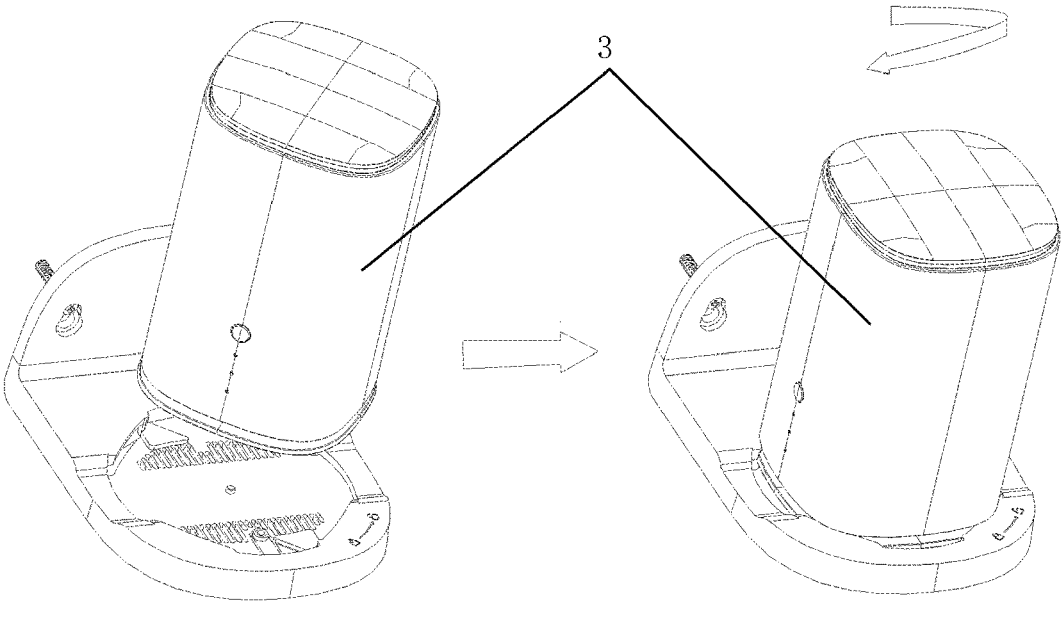
FIG. 7 is a schematic diagram illustrating CPE rotation according to Embodiment three of the present disclosure.
Figure 8:
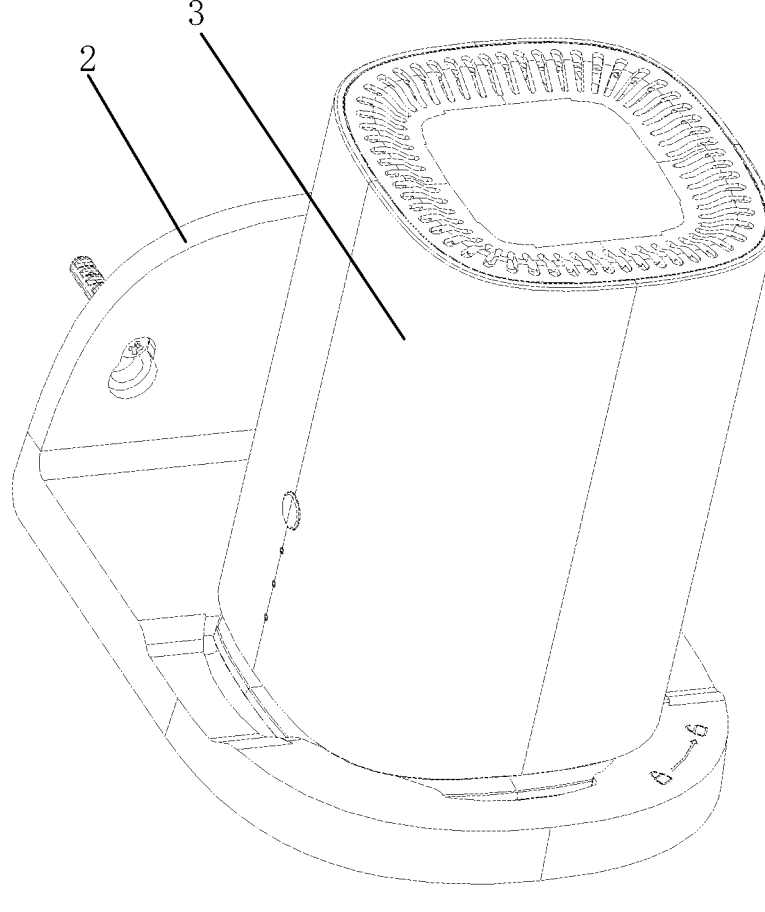
FIG. 8 is a schematic diagram illustrating a first CPE mounting direction according to Embodiment three of the present disclosure.
Figure 9:
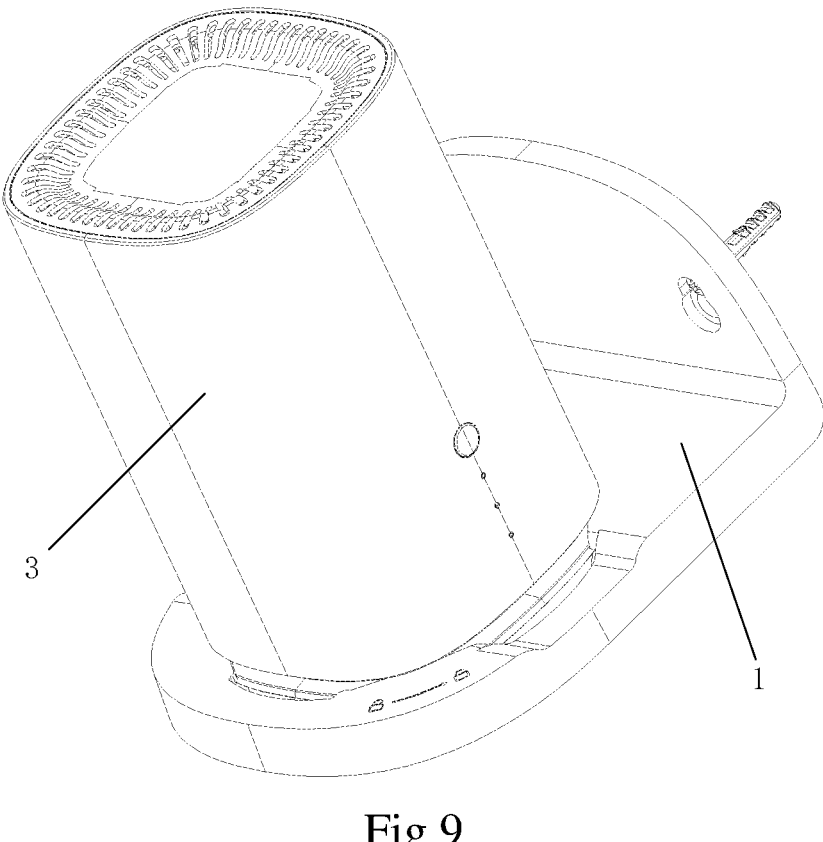
FIG. 9 is a schematic diagram illustrating a second CPE mounting direction according to Embodiment three of the present disclosure.

As shown in FIG. 6, two first stoppers 15 having a protruding triangular structure are provided symmetrically at the bottom of the accommodation cavity. Due to the stopping effect of the two first stoppers 15, the CPE can only be inserted into the accommodation cavity according to a form as shown in FIG. 6 or by rotating the CPE by 180° as shown in FIG. 6. Then, due to the stopping effect of the two first stoppers 15, as shown in FIG. 7, the CPE can only rotate clockwise. The effect after mounting is shown in FIG. 8 or FIG. 9.

The mounting bracket provided in this embodiment is mounted with the CPE by adopting a rotary cooperation between the first fasteners provided at intervals along the circumferential direction of the accommodation cavity and the second fastener at the mounting end of the CPE, which is simple, labor-saving and easy to remove, thereby effectively avoiding scratching of the body, avoiding damage to the fasteners of the bracket, and extending the service life of the bracket. At the same time, the mounting of the CPE has both orientation function and pool-proofing function, so as to satisfy scenarios where a user has requirements on the mounting direction.

According to the mounting bracket for the customer premise equipment and the customer premise equipment provided in the embodiments of the present disclosure, an accommodation cavity is provided on the mounting bracket, and at least one pair of first fasteners opposite to each other are provided on the accommodation cavity, such that a mounting of the CPE may be completed by screwing second fastener of the CPE into the first fasteners, and when a disassembly of the CPE is required, the CPE may be unscrewed. Therefore, the mounting bracket of the present disclosure is easy to operate and will not cause scratching of the appearance of the CPE.

The above content provides a further detailed illustration of the embodiments of the present disclosure in combination with specific implementations, but it cannot be considered that the specific implementations of the present disclosure are limited to therein. For one of ordinary skill in the art to which the present disclosure belongs, several simple deductions or substitutions may be made without departing from the concept of the present disclosure, all of which should be considered to fall into the scope of protection of the present disclosure.

What is claimed is:

1. A mounting bracket for a customer premise equipment, comprising a bracket base and a fixing frame, wherein
the bracket base is fixedly connected to the fixing frame, an accommodation cavity for allowing a mounting end of a customer premise equipment CPE to be inserted is formed in the bracket base, and a bottom of the accommodation cavity is in contact with a bottom of the mounting end to form a support for the mounting end;
a plurality of first fasteners extending towards a center of the accommodation cavity are provided on a side wall of the accommodation cavity; at least two of the plurality of first fasteners are provided opposite to each other, a gap is reserved between a first fastener and the bottom of the accommodation cavity; and a height of the gap is adapted to a thickness of a second fastener on the mounting end;
after the mounting end of the CPE is inserted into the accommodation cavity, the CPE is rotated to engage the first fasteners with the second fastener, to complete mounting of the CPE,
wherein the mounting bracket further comprises at least one first stopper, the at least one first stopper protrudes towards an axial line of the accommodation cavity, and the first stopper is provided to cooperate with a foot pad on the second fastener to limit a rotation angle of the CPE, and/or
wherein the mounting bracket further comprises at least one second stopper, the at least one second stopper is provided on the side wall of the accommodation cavity, and the second stopper is provided to cooperate with an outer edge of the second fastener to limit the rotation angle of the CPE; and
wherein two first stoppers are provided symmetrically, and the two first stoppers are provided to cooperate with the foot pad to limit the rotation direction of the CPE.

2. The mounting bracket for a customer premise equipment according to claim 1, wherein
the mounting bracket further comprises at least one positioning member provided in the accommodation cavity, and the positioning member is provided to lock the CPE after the CPE is rotated to a predetermined position.

3. The mounting bracket for a customer premise equipment according to claim 1, wherein
the number of the first fasteners is 2 or 4; and
the first fasteners are provided symmetrically on the side wall of the accommodation cavity.

4. The mounting bracket for a customer premise equipment according to claim 1, wherein
an insertion direction guidance identifier for the CPE is further provided on the bracket base.

5. The mounting bracket for a customer premise equipment according to claim 1, wherein a heat dissipation slot is further provided at the bottom of the accommodation cavity.

6. The mounting bracket for a customer premise equipment according to claim 1, wherein the mounting bracket comprises two second stoppers provided symmetrically, and the two second stoppers are provided to cooperate with the outer edge of the second fastener to limit the rotation direction of the CPE.

7. The mounting bracket for a customer premise equipment according to claim 1, wherein the mounting bracket comprises the first stopper and the second stopper, and the first stopper and the second stopper are paired with each other and disposed at positions that correspond to each other.

\* \* \* \* \*